US012625300B2

(12) United States Patent
Uchida

(10) Patent No.: US 12,625,300 B2
(45) Date of Patent: May 12, 2026

(54) OPTICAL ELEMENT AND OPTICAL DEVICE INCLUDING THE SAME

(71) Applicant: CANON KABUSHIKI KAISHA, Tokyo (JP)

(72) Inventor: Kazue Uchida, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1103 days.

(21) Appl. No.: 17/541,984

(22) Filed: Dec. 3, 2021

(65) Prior Publication Data

US 2022/0187502 A1 Jun. 16, 2022

(30) Foreign Application Priority Data

Dec. 11, 2020 (JP) ................................. 2020-205576

(51) Int. Cl.
*G02B 1/11* (2015.01)

(52) U.S. Cl.
CPC ....................................... *G02B 1/11* (2013.01)

(58) Field of Classification Search
CPC ......................................................... G02B 1/11
USPC ........................................................ 359/601
See application file for complete search history.

(56) References Cited

U.S. PATENT DOCUMENTS

| | | | | |
|---|---|---|---|---|
| 2005/0219724 A1* | 10/2005 | Teramoto | ............... | G02B 1/113 |
| | | | | 359/883 |
| 2013/0163087 A1* | 6/2013 | Lecolley | ................ | G02B 1/113 |
| | | | | 65/17.2 |
| 2017/0068287 A1* | 3/2017 | Jung | ........................ | G02B 1/111 |
| 2019/0116300 A1* | 4/2019 | Okuno | ........... | G02B 15/144113 |

FOREIGN PATENT DOCUMENTS

| | | | | | |
|---|---|---|---|---|---|
| EP | 3141934 A1 | * | 3/2017 | ............. | G02B 1/111 |
| JP | 2005292462 A | | 10/2005 | | |
| JP | 2011237472 A | | 11/2011 | | |
| JP | 2017134404 A | | 8/2017 | | |
| JP | 2018024561 A | * | 2/2018 | | |
| JP | 2018151484 A | | 9/2018 | | |
| JP | 2019070695 A | | 5/2019 | | |
| JP | 2020166245 A | | 10/2020 | | |
| WO | WO-2014103768 A1 | * | 7/2014 | ............... | B32B 7/02 |

OTHER PUBLICATIONS

Translation of EP 3141934 (Year: 2025).*
Translation of JP_2018024561 (Year: 2025).*
Translation of WO_2014103768_A1 (Year: 2025).*

* cited by examiner

*Primary Examiner* — Jerry L Brooks
(74) *Attorney, Agent, or Firm* — Canon U.S.A., Inc. IP Division

(57) ABSTRACT

An optical element includes a substrate made of a resin material and an antireflection film. The antireflection film consists of a dielectric layer formed on the substrate and a porous layer formed on the dielectric layer. The dielectric layer includes a first layer including silicon oxide and a second layer including tantalum oxide. The porous layer includes silicon oxide or magnesium fluoride.

14 Claims, 17 Drawing Sheets

OPTICAL ELEMENT AND OPTICAL DEVICE INCLUDING THE SAME

BACKGROUND OF THE INVENTION

Field of the Invention

The present disclosure relates to optical elements, for example, optical elements suitable for use in optical devices such as digital still cameras, digital video cameras, silver-halide film cameras, and telescopes.

Description of the Related Art

Japanese Patent Laid-Open No. 2017-134404 discloses an optical element including an antireflection film disposed on a substrate made of a resin material. The antireflection film consists of, in sequence, a multiple layer including a silicon oxide layer and a tantalum oxide layer, a homogeneous layer consisting of magnesium fluoride, and a homogeneous layer consisting of silicon oxide. In Japanese Patent Laid-Open No. 2017-134404, materials that can be formed without heating are used for the multiple layer disposed on the substrate to reduce thermal deformation of the substrate.

However, a strong tensile stress occurs in the homogeneous layer consisting of magnesium fluoride according to Japanese Patent Laid-Open No. 2017-134404; therefore, film cracking (crack) or film peeling can occur due to changes in environmental conditions such as temperature. In addition, it is difficult to improve the antireflection performance of the antireflection film according to Japanese Patent Laid-Open No. 2017-134404 because the homogeneous layer consisting of silicon oxide is further disposed on the homogeneous layer consisting of magnesium fluoride.

SUMMARY OF THE INVENTION

An optical element according to an aspect of the present disclosure includes a substrate made of a resin material and an antireflection film. The antireflection film consists of a dielectric layer formed on the substrate and a porous layer formed on the dielectric layer. The dielectric layer includes a first layer including silicon oxide and a second layer including tantalum oxide. The porous layer includes silicon oxide or magnesium fluoride.

Further features of the present disclosure will become apparent from the following description of exemplary embodiments with reference to the attached drawings.

BRIEF DESCRIPTION OF THE DRAWINGS

FIG. 16 is a schematic view of an optical system according to an embodiment of the present disclosure.

DESCRIPTION OF THE EMBODIMENTS

Figure 1A:
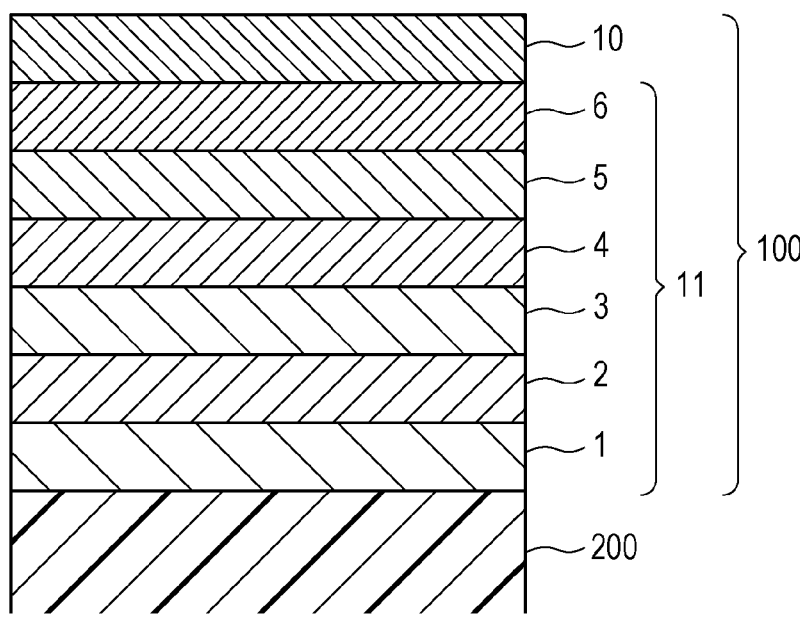
FIGS. 1A and 1B are schematic views of an optical element according to an embodiment of the present disclosure.

Embodiments of the present disclosure will now be described with reference to the drawings. The drawings may not be drawn to scale for purposes of illustration. In addition, the same members in the drawings are denoted by the same reference numerals, and a redundant description thereof is omitted.

Figure 1B:
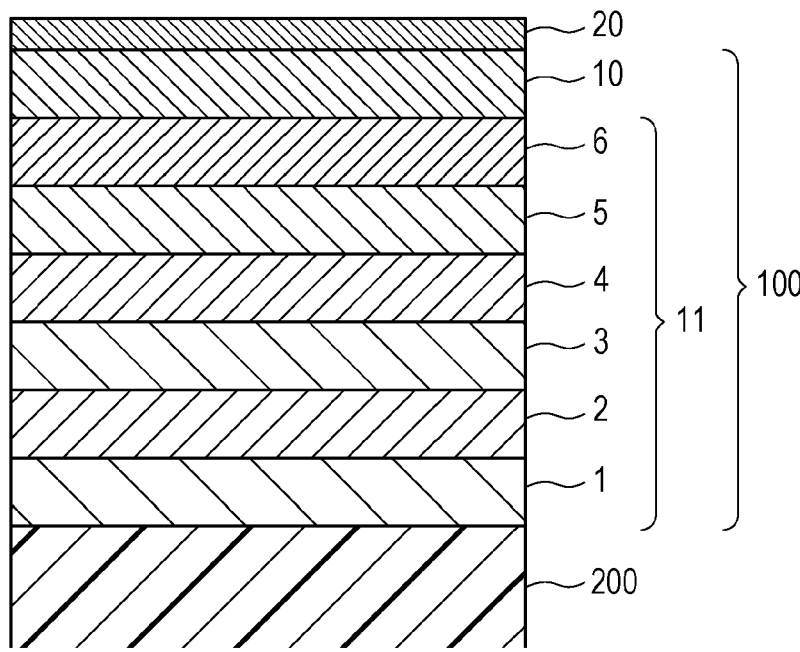

FIGS. 1A and 1B are schematic views (sectional views) of an optical element 300 according to an embodiment of the present disclosure. The optical element 300 includes a substrate (resin substrate) 200 made of a resin material and an antireflection film 100 formed on the substrate 200. "Resin material" according to the present embodiment refers to a material containing a resin (organic material) as a principal component, that is, a material in which a resin is present in the largest proportion, including mixtures of different resins and resins having fine particles of inorganic materials dispersed therein (organic composites).

The antireflection film 100 consists of a dielectric layer 11 consisting of a plurality of dielectric thin films formed on the substrate 200 and a porous layer 10 formed on the dielectric layer 11. The dielectric layer 11 consists of, in order from the substrate 200 side, layers 1, 2, 3, 4, 5, and 6, one of which is a layer including silicon oxide (first layer) and another one of which is a layer including tantalum oxide (second layer).

Although the dielectric layer 11 in the present embodiment consists of six layers, the number of layers forming the dielectric layer 11 is not limited thereto. Rather, the dielectric layer 11 may consist of any number of layers as long as the dielectric layer 11 includes at least a layer including silicon oxide and a layer including tantalum oxide. In addition, as illustrated in FIG. 1B, another layer such as a water-repellent layer, an oil-repellent layer, or a protective layer (protective film) for protecting the porous layer 10 may be disposed on the antireflection film 100. In this case, a plurality of layers may be disposed on the antireflection film 100. Examples of layers that can be disposed on the antireflection film 100 include layers formed from coating materials containing fluorine and layers formed from coating materials containing silicon oxide.

In general, resin materials are susceptible to deformation and discoloration at high temperature. Thus, when thermal deposition and baking are performed to form the antireflection film 100 on the substrate 200, the temperature may be 200° C. or lower, preferably 120° C. or lower, more preferably 80° C. or lower. In addition, resin materials have a larger coefficient of linear expansion than inorganic materials such as glass and thus have a greater tendency to expand with increasing temperature. Therefore, film cracking or film peeling can occur when a film in which a tensile stress occurs in the direction opposite to the expansion direction of the resin material is formed on the substrate 200. Thus, materials that can be deposited without heating or with heating at low temperature, i.e., 80° C. or lower, and that provide sufficient film strength and compressive stress may be used for the antireflection film 100.

Accordingly, in the present embodiment, silicon oxide and tantalum oxide are used as materials that satisfy these conditions. Specifically, the dielectric layer 11 has a configuration including a layer including silicon oxide (first layer) and a layer including tantalum oxide (second layer). This configuration provides good antireflection performance through the use of silicon oxide, which has a low refractive index, in combination with tantalum oxide, which has a high refractive index, and also induces a compressive stress in the first layer and the second layer, thereby inhibiting film cracking and film peeling due to the expansion of the substrate 200.

To accommodate large expansion of the substrate 200, a material in which a strong compressive stress occurs may be used. After conducting intensive research, the inventor has found that the compressive stress that occurs in silicon oxide can be increased if it contains a certain amount of aluminum (Al). Thus, a material including 90% by weight or more of silicon oxide and 10% by weight or less of aluminum may be used for the first layer. The inventor has also found that even the presence (addition) of a very small amount of aluminum is effective in improving the environmental durability. In this case, the amount of aluminum present in the first layer may be 0.001% by weight or more.

In addition to tantalum oxide, examples of high-refractive-index materials that provide sufficient film strength when deposited without heating or with heating at low temperature, i.e., 80° C. or lower, include titanium oxide, lanthanum oxide, and zirconium oxide. Thus, a material including at least one of titanium oxide, lanthanum oxide, and zirconium oxide in addition to tantalum oxide may be used for the second layer.

To further improve the environmental durability, of the layers forming the dielectric layer 11, the layer 1 located at the position closest to the substrate 200 may be the first layer or the second layer. Furthermore, the dielectric layer 11 may consist of alternately stacked first and second layers. That is, the dielectric layer 11 may consist of one or more first layers and two or more second layers or may consist of two or more first layers and one or more second layers. In this case, the dielectric layer 11 may consist of a plurality of first layers and a plurality of second layers. These configurations can more effectively inhibit deformation and discoloration of the substrate 200 and film cracking and film peeling of the dielectric layer 11.

The method for forming the dielectric layer 11 is not particularly limited. For example, physical vapor deposition processes such as evaporation, sputtering, and ion plating can be used. Examples of methods for heating deposition materials in evaporation include resistance heating, electron beam evaporation, and laser evaporation. In electron beam evaporation, a deposition material can be directly heated, which inhibits heating and contamination of the substrate 200. To induce sufficient compressive stress in the first layer and the second layer, ion-beam-assisted deposition may also be used. In ion-beam-assisted deposition, in which an independent ion source serves to assist in deposition, a film with low absorption and scattering and high strength can be formed.

It is commonly known that the antireflection performance of an antireflection film improves as the refractive index of the material forming the uppermost layer (the layer farthest from the substrate) decreases. Accordingly, the uppermost layer of the antireflection film 100 in the present embodiment is the porous layer 10, which includes air gaps therein. Thus, the refractive index of the uppermost layer can be considerably reduced compared to an uppermost layer including no air gaps therein. Furthermore, silicon oxide or magnesium fluoride is used as the material for the porous layer 10 in the present embodiment because of their relatively low refractive indices. Thus, the refractive index of the uppermost layer of the antireflection film can be sufficiently reduced, and good antireflection performance can be achieved.

Here, the following conditional expression (1) may be satisfied:

$$1.15 \leq n \leq 1.35 \tag{1}$$

where n is the refractive index of the porous layer 10 for the d-line.

The refractive index n of the porous layer 10 can be determined from the proportion of the material forming the porous layer 10 to air gaps and their refractive indices. Specifically, the refractive index n decreases as the proportion of air gaps in the porous layer 10 increases. Satisfying conditional expression (1) allows the refractive index of the porous layer 10 to be sufficiently reduced while sufficiently maintaining the strength of the porous layer 10, thus providing both environmental durability and good antireflection performance. Furthermore, the following conditional expression (1a) may be satisfied:

$$1.20 \leq n \leq 1.31 \tag{1a}$$

The method for forming the porous layer 10 may be, for example, a sol-gel process. The method for applying a coating liquid in the sol-gel process is not particularly limited, and methods such as dip coating, spin coating, spray coating, and roller coating can be used. Of these, spin coating, which is relatively easy to perform, may be used. Although the sol-gel process includes a heat treatment step, baking can be performed at low temperature using a solvent having a low boiling point, which inhibits deformation and discoloration of the substrate 200. Thus, the material for the porous layer 10 may be a material that hardens at low temperature, i.e., 80° C. or lower.

The solvent used to form the porous layer 10 may be an alcohol with a density of 1.0 mg/cm³ to 2.8 mg/cm³ that includes at least one of an ether bond and an ester bond, that includes 4 to 7 carbon atoms, and that has a branched structure. Examples of alcohols include 1-methoxy-2-pro-panol, 1-ethoxy-2-propanol, 1-propoxy-2-propanol, 1-bu-toxy-2-propanol, 2-isopropoxyethanol, and 3-methoxy-1-butanol. Methyl lactate and ethyl lactate may also be used. The alcohol used as the solvent may be one or more alcohols. The alcohol used as the solvent remains within the porous layer 10 and serves to control the air gap size.

To form air gaps in the porous layer 10, the porous layer 10 may include a plurality of particles consisting of silicon oxide and a binder that binds the plurality of particles to each other. In this case, for example, spherical solid or hollow particles or ring-shaped or hook-shaped solid particles may be used as the plurality of particles. To increase the propor-tion of air (air gaps) in the porous layer 10 and thereby decrease the refractive index of the porous layer 10, hollow particles or ring-shaped or hook-shaped solid particles may be used. If solid particles are used, the individual particles are bound (linked) to each other in a chain-like manner to form a chain-like structure (particles), which ensures suffi-cient strength while forming many air gaps.

At least one of the following conditional expressions (2) and (3) may be satisfied:

$$1.48 \leq nd \leq 1.80 \qquad (2)$$

where nd is the average refractive index of the resin material forming the substrate 200 for the d-line; and $$1.5 \leq \alpha \leq 30.0 \qquad (3)$$

where $\alpha$ is the coefficient of linear expansion ($10^{-5}/^\circ$ C.) of the resin material. The use of a resin material satisfying at least one of conditional expressions (2) and (3) for the substrate 200 ensures both design flexibility of the optical element 300 and ease of manufacture and optical perfor-mance of the substrate 200.

Specific examples of the present embodiment are given below. However, these examples are merely illustrative of the present embodiment, and the present disclosure is not limited to the scope of these examples.

Example 1

An optical element 300 according to Example 1 of the present disclosure will now be described. The configuration of the optical element 300 according to the present example is similar to that of the embodiment illustrated in FIG. 1A.

The material for the substrate 200 according to the present example is ZEONEX available from Zeon Corporation, which is a cycloolefin polymer (COP) resin having a refrac-tive index of 1.53 for the d-line. The materials for the dielectric layer 11 according to the present example are SiO$_2$, serving as silicon oxide, and Ta$_2$O$_5$, serving as tanta-lum oxide. The material for the porous layer 10 according to the present example is chain-like particles consisting of SiO$_2$ (chain-like silica).

Table 1 shows details of the configuration of the optical element 300 according to the present example.

TABLE 1

| | Material | Refractive index (d-line) | Physical thickness (nm) |
|---|---|---|---|
| Porous layer 10 | Chain-like silica | 1.25 | 127.8 |
| Dielectric | Layer 6 | Ta$_2$O$_5$ | 2.00 | 17.7 |
| layer 11 | Layer 5 | SiO$_2$ | 1.45 | 66.3 |
| | Layer 4 | Ta$_2$O$_5$ | 2.00 | 24.4 |

TABLE 1-continued

| | Material | Refractive index (d-line) | Physical thickness (nm) |
|---|---|---|---|
| Layer 3 | SiO$_2$ | 1.45 | 53.9 |
| Layer 2 | Ta$_2$O$_5$ | 2.00 | 11.8 |
| Layer 1 | SiO$_2$ | 1.45 | 10.1 |
| Substrate 200 | COP resin | 1.53 | — |

A method for forming an antireflection film 100 according to the present example will now be described.

(a) Method for Forming Dielectric Layer 11

The substrate 200 was placed on a deposition jig in a deposition chamber (vacuum chamber), and granular SiO$_2$ and Ta$_2$O$_5$ were placed in crucibles as deposition materials. The deposition chamber was evacuated to a high-vacuum state around $2 \times 10^{-3}$ (Pa) without heating. After it was confirmed that the deposition chamber was in a high-vacuum state, Ar was introduced into an ion gun as an inert gas, and the ion gun was caused to discharge. After the ion gun became stable, oxygen was introduced into the deposi-tion chamber, and ion-beam-assisted deposition was per-formed with oxygen ions at a vacuum pressure of about $1 \times 10^{-2}$ (Pa).

(b) Method for Forming Porous Layer 10

(b-1) Preparation of Chain-Like Silica Coating Liquid and Binder Solution

First, a dispersion (chain-like silica dispersion) including chain-like silica particles and a solvent was prepared. IPA-ST-UP (average particle size: 12 nm, solid content: 15% by mass) available from Nissan Chemical Corporation, which contained 2-propanol (IPA) as a solvent, was used, and the solvent was replaced with 1-propoxy-2-propanol using an evaporator. The ratio of the solvent in the chain-like silica dispersion was IPA:1-propoxy-2-propanol=7.5:92.5.

Next, a solution (binder solution) containing components required to form a binder was prepared. Specifically, 18.5 g of tetraethoxysilane (TEOS) available from Tokyo Chemical Industry Co., Ltd. and 16.0 g (10 equivalents based on TEOS) of 0.1 wt % phosphinic acid, serving as a catalyst in water, were mixed and stirred in a water bath at 20° C. for 60 minutes.

Furthermore, 33.4 g of the binder solution was added to 251.3 g of the chain-like silica dispersion, and 174.5 g of 1-propoxy-2-propanol and 546.5 g of ethyl lactate were added, followed by stirring for 60 minutes to obtain a chain-like silica coating liquid.

(b-2) Method for Applying Porous Layer 10

After the chain-like silica coating liquid was dispensed onto the dielectric layer 11 formed on the substrate 200, spin coating was performed at 4,000 rpm for 20 seconds. The coating was then baked in a hot-air circulating oven at 25° C. for 10 minutes to form a porous layer 10.

Figure 2:
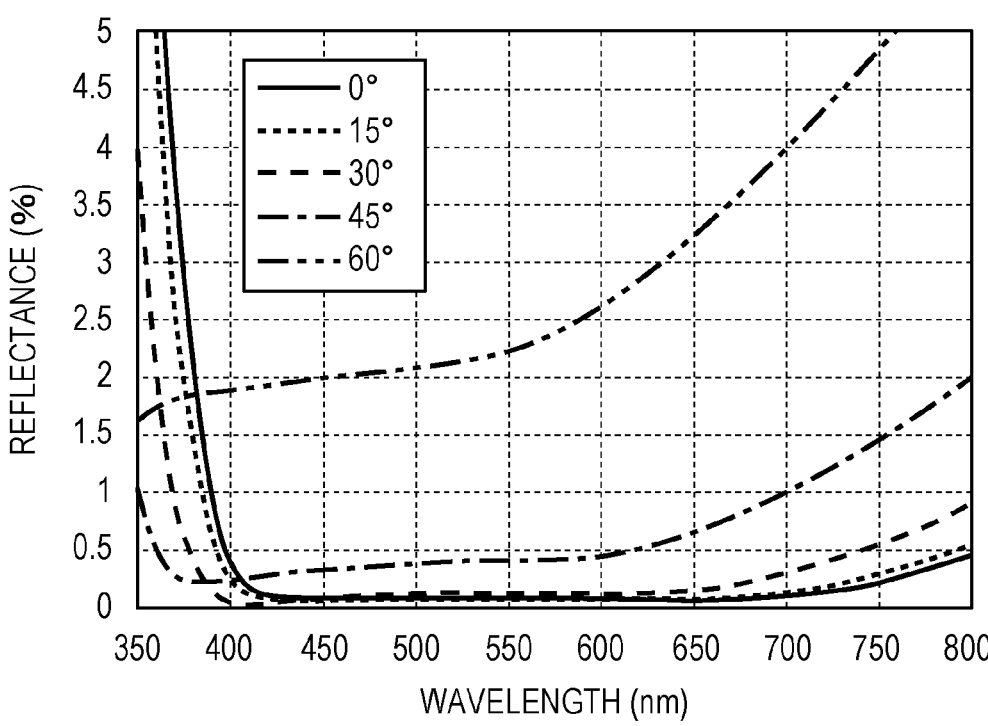
FIG. 2 is a graph showing the reflectance characteristics of an optical element according to Example 1 of the present disclosure.

FIG. 2 shows the reflectance characteristics of the optical element 300 according to the present example. FIG. 2 shows the relationship between the reflectance for light incident on the optical element 300 at angles of incidence of 0°, 15°, 30°, 45°, and 60° and the wavelength of the incident light. As shown in FIG. 2, the reflectance at an angle of incidence of 0° is 0.15% or less in the visible region, i.e., a wavelength range of 420 to 700 nm, demonstrating that good antireflec-tion performance was achieved.

Example 2

An optical element 300 according to Example 2 of the present disclosure will now be described. In the present example, a description of a configuration similar to that of Example 1 described above is omitted.

The material for the substrate 200 is a COP resin similar to that of Example 1. The materials for the dielectric layer 11 are $SiO_2$ including 0.001% by weight of Al and $Ta_2O_5$. The material for the porous layer 10 is chain-like silica similar to that of Example 1. The dielectric layer 11 according to the present example consists of seven layers, unlike that of Example 1. The methods for forming the dielectric layer 11 and the porous layer 10 are similar to those of Example 1.

Table 2 shows details of the configuration of the optical element 300 according to the present example.

TABLE 2

|  |  | Material | Refractive index (d-line) | Physical thickness (nm) |
|---|---|---|---|---|
| Porous layer 10 |  | Chain-like silica | 1.25 | 126.2 |
| Dielectric layer 11 | Layer 7 | $Ta_2O_5$ | 2.00 | 20.3 |
|  | Layer 6 | $SiO_2$ (Al content: 0.001% by weight) | 1.45 | 57.7 |
|  | Layer 5 | $Ta_2O_5$ | 2.00 | 27.2 |
|  | Layer 4 | $SiO_2$ (Al content: 0.001% by weight) | 1.45 | 29.8 |
|  | Layer 3 | $Ta_2O_5$ | 2.00 | 10.0 |
|  | Layer 2 | $SiO_2$ (Al content: 0.001% by weight) | 1.45 | 30.1 |
|  | Layer 1 | $Ta_2O_5$ | 2.00 | 10.8 |
| Substrate 200 |  | COP resin | 1.53 | — |

Figure 3:
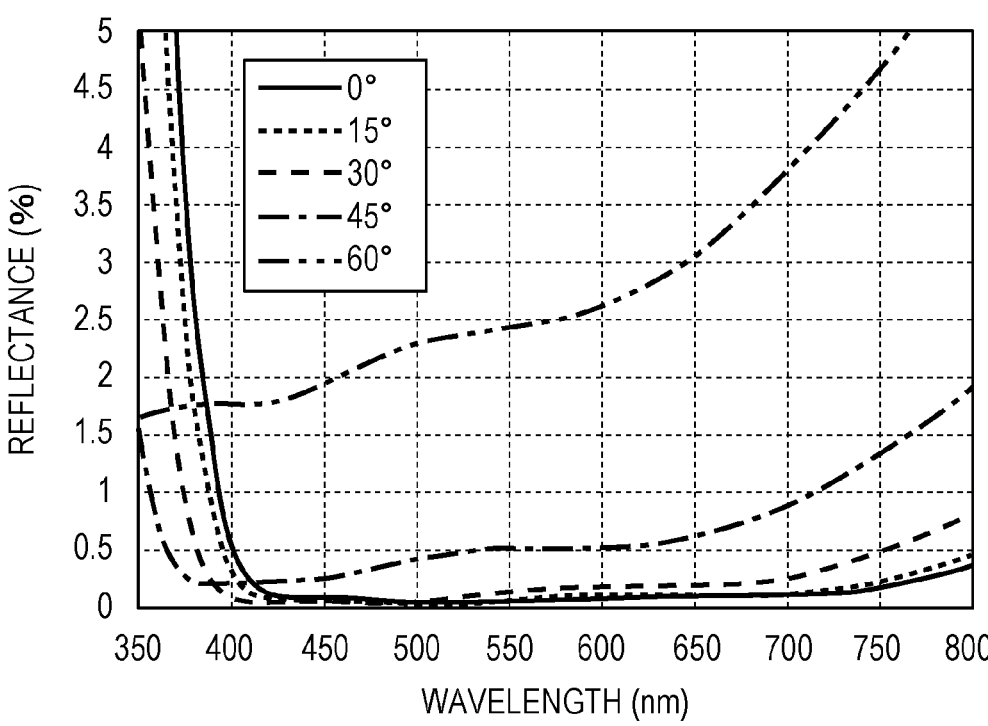
FIG. 3 is a graph showing the reflectance characteristics of an optical element according to Example 2 of the present disclosure.

FIG. 3 shows the reflectance characteristics of the optical element 300 according to the present example as in Example 1 (FIG. 2). As shown in FIG. 3, the reflectance at an angle of incidence of 0° is 0.15% or less in the visible region, i.e., a wavelength range of 420 to 700 nm, demonstrating that good antireflection performance was achieved.

Example 3

An optical element 300 according to Example 3 of the present disclosure will now be described. The configuration of the optical element 300 according to the present example is similar to that of the embodiment illustrated in FIG. 1B.

The material for the substrate 200 is a COP resin similar to that of Example 1. The materials for the dielectric layer 11 are $SiO_2$ including 3.0% by weight of Al and a mixture of $Ta_2O_5$ and $TiO_2$. The material for the porous layer 10 is chain-like silica. A protective layer 20 containing TEOS as a principal component is disposed on the porous layer 10. The method for forming the dielectric layer 11 is similar to that of Example 1.

Table 3 shows details of the configuration of the optical element 300 according to the present example.

TABLE 3

|  |  | Material | Refractive index (d-line) | Physical thickness (nm) |
|---|---|---|---|---|
| Protective layer 20 |  | TEOS | 1.42 | 20.0 |
| Porous layer 10 |  | Chain-like silica | 1.46 | 100.3 |
| Dielectric layer 11 | Layer 6 | $Ta_2O_5$ + $TiO_2$ | 2.00 | 25.2 |
|  | Layer 5 | $SiO_2$ (Al content: 3% by weight) | 1.46 | 49.6 |
|  | Layer 4 | $Ta_2O_5$ + $TiO_2$ | 2.00 | 47.3 |
|  | Layer 3 | $SiO_2$ (Al content: 3% by weight) | 1.46 | 40.9 |

TABLE 3-continued

|  |  | Material | Refractive index (d-line) | Physical thickness (nm) |
|---|---|---|---|---|
|  | Layer 2 | $Ta_2O_5$ + $TiO_2$ | 2.00 | 22.5 |
|  | Layer 1 | $SiO_2$ (Al content: 3% by weight) | 1.46 | 12.0 |
| Substrate 200 |  | COP resin | 1.53 | — |

A method for forming the porous layer 10 and the protective layer 20 according to the present example will now be described.

(c) Method for Forming Porous Layer 10 and Protective Layer 20

(c-1) Preparation of Chain-Like Silica Coating Liquid

A chain-like silica coating liquid according to the present example was prepared in the same manner as in (b-1) of Example 1.

(c-2) Preparation of Protective Layer Coating Liquid

To 7.7 g of 1-ethoxy-2-propanol available from Kishida Chemical Co., Ltd. were added 26.0 g of TEOS available from Tokyo Chemical Industry Co., Ltd. and 22.5 g (10 equivalents based on TEOS) of 0.01 M dilute hydrochloric acid, serving as a catalyst in water, and they were mixed and stirred for 60 minutes. The mixture was further stirred in an oil bath at 60° C. for 40 minutes. To the mixture, 1-ethoxy-2-propanol and 2-ethylbutanol were then added to a silica solid content of 0.8 wt % to obtain a protective layer coating liquid. Here, the ratio of 1-ethoxy-2-propanol to 2-ethylbutanol was 3:7.

(c-3) Method for Applying Porous Layer 10 and Protective Layer 20

After 0.2 mL of the chain-like silica coating liquid was dispensed onto the dielectric layer 11 formed on the substrate 200, spin coating was performed at 4,000 rpm for 20 seconds. Subsequently, after 0.2 mL of the protective layer coating liquid was dispensed onto the chain-like silica coating liquid applied to the dielectric layer 11, spin coating was performed at 4,000 rpm for 20 seconds. The coating was then baked in a hot-air circulating oven at 25° C. for 10 minutes to form a porous layer 10 and a protective layer 20.

Figure 4:
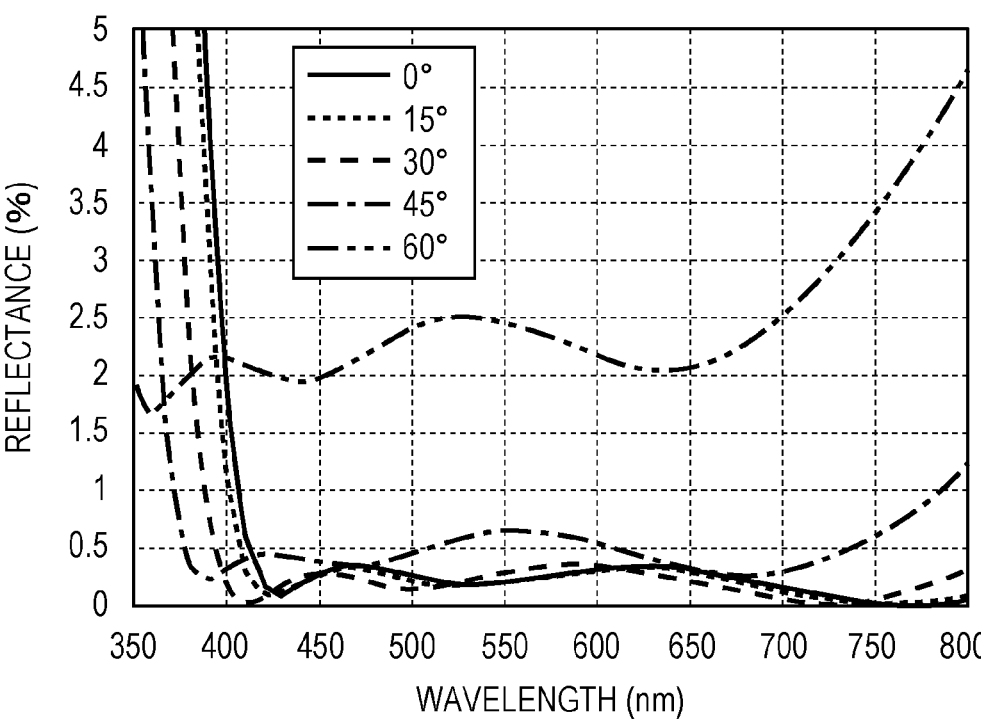
FIG. 4 is a graph showing the reflectance characteristics of an optical element according to Example 3 of the present disclosure.

FIG. 4 shows the reflectance characteristics of the optical element 300 according to the present example as in Example 1. As shown in FIG. 4, the reflectance at an angle of incidence of 60° is 2.5% or less in the visible region, i.e., a wavelength range of 420 to 700 nm, demonstrating that good antireflection performance was also achieved at a large angle of incidence.

Example 4

An optical element 300 according to Example 4 of the present disclosure will now be described. In the present example, a description of a configuration similar to those of the examples described above is omitted.

The material for the substrate 200 is a COP resin similar to that of Example 3. The materials for the dielectric layer 11 are $SiO_2$ including 10.0% by weight of Al and a mixture of $Ta_2O_5$ and $TiO_2$. The material for the porous layer 10 is chain-like silica similar to that of Example 3. The material for the protective layer 20 is a material, containing TEOS as a principal component, similar to that of Example 3. The dielectric layer 11 according to the present example consists of seven layers, unlike that of Example 3. The methods for forming the dielectric layer 11, the porous layer 10, and the protective layer 20 are similar to those of Example 3.

Table 4 shows details of the configuration of the optical element 300 according to the present example.

TABLE 4

| | | Refractive index (d-line) | Physical thickness (nm) |
|---|---|---|---|
| | Material | | |
| Protective layer 20 | TEOS | 1.42 | 20.0 |
| Porous layer 10 | Chain-like silica | 1.25 | 97.9 |
| Dielectric layer 11 Layer 7 | $Ta_2O_5 + TiO_2$ | 2.00 | 26.7 |
| Layer 6 | $SiO_2$ (Al content: 10.0% by weight) | 1.45 | 33.4 |
| Layer 5 | $Ta_2O_5 + TiO_2$ | 2.00 | 66.8 |
| Layer 4 | $SiO_2$ (Al content: 10.0% by weight) | 1.45 | 17.4 |
| Layer 3 | $Ta_2O_5 + TiO_2$ | 2.00 | 22.9 |
| Layer 2 | $SiO_2$ (Al content: 10.0% by weight) | 1.45 | 26.0 |
| Layer 1 | $Ta_2O_5 + TiO_2$ | 2.00 | 12.0 |
| Substrate 200 | COP resin | 1.53 | — |

Figure 5:
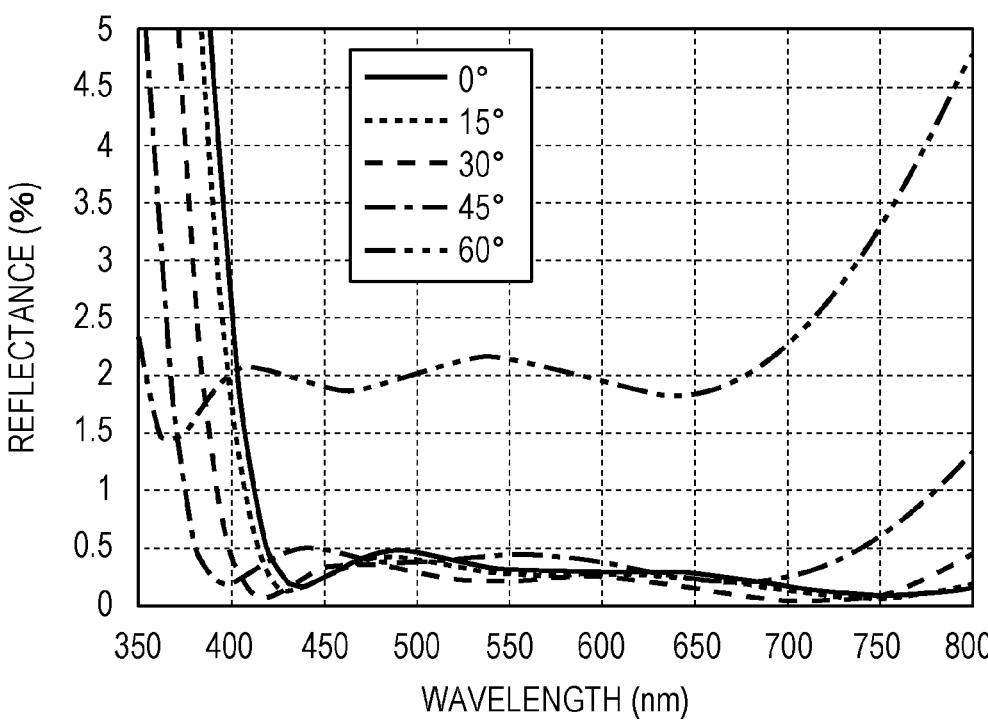
FIG. 5 is a graph showing the reflectance characteristics of an optical element according to Example 4 of the present disclosure.

FIG. 5 shows the reflectance characteristics of the optical element 300 according to the present example as in Example 1. As shown in FIG. 5, the reflectance at an angle of incidence of 60° is 2.5% or less in the visible region, i.e., a wavelength range of 420 to 700 nm, demonstrating that good antireflection performance was also achieved at a large angle of incidence.

Example 5

An optical element 300 according to Example 5 of the present disclosure will now be described. In the present example, a description of a configuration similar to those of the examples described above is omitted.

The material for the substrate 200 according to the present example is EP-5000 available from Mitsubishi Gas Chemical Company, Inc., which is a special polycarbonate (PC) resin having a refractive index of 1.64 for the d-line. The materials for the dielectric layer 11 are $SiO_2$ and a mixture of $Ta_2O_5$ and $ZrO_2$. The material for the porous layer 10 is chain-like silica similar to that of Example 1. The methods for forming the dielectric layer 11 and the porous layer 10 are similar to those of Example 1.

Table 5 shows details of the configuration of the optical element 300 according to the present example.

TABLE 5

| | | Refractive index (d-line) | Physical thickness (nm) |
|---|---|---|---|
| | Material | | |
| Porous layer 10 | Chain-like silica | 1.25 | 119.2 |
| Dielectric layer 11 Layer 6 | $SiO_2$ | 1.45 | 23.1 |
| Layer 5 | $Ta_2O_5 + ZrO_2$ | 2.00 | 50.1 |
| Layer 4 | $SiO_2$ | 1.45 | 42.6 |
| Layer 3 | $Ta_2O_5 + ZrO_2$ | 2.00 | 38.0 |
| Layer 2 | $SiO_2$ | 1.45 | 24.4 |
| Layer 1 | $Ta_2O_5 + ZrO_2$ | 2.00 | 12.3 |
| Substrate 200 | Special PC | 1.64 | — |

Figure 6:
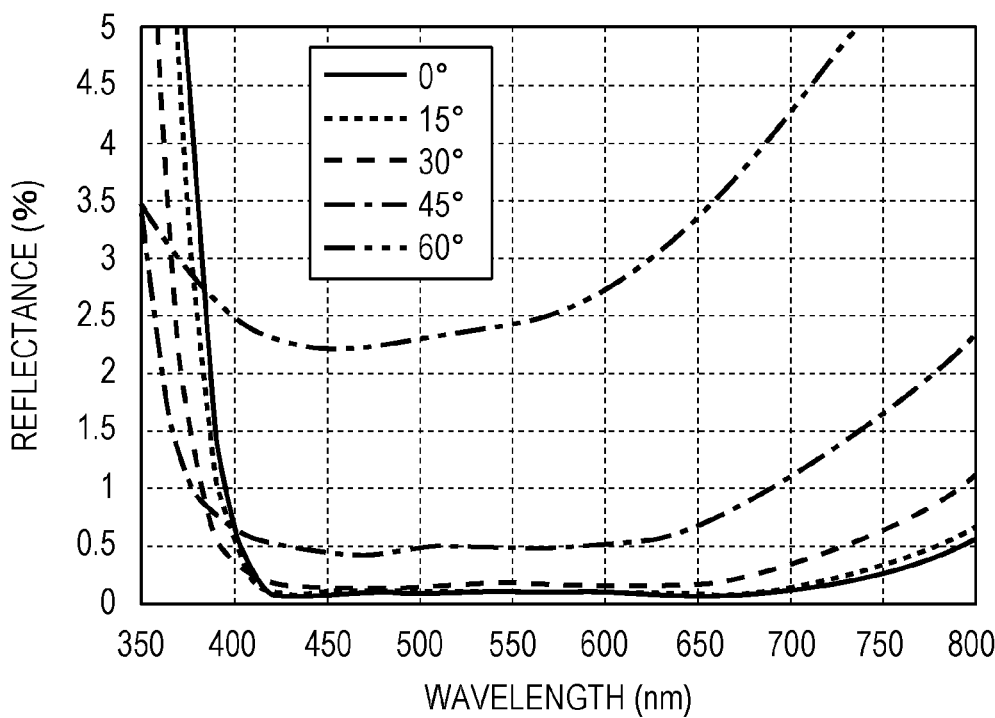
FIG. 6 is a graph showing the reflectance characteristics of an optical element according to Example 5 of the present disclosure.

FIG. 6 shows the reflectance characteristics of the optical element 300 according to the present example as in Example 1. As shown in FIG. 6, the reflectance at an angle of incidence of 0° is 0.15% or less in the visible region, i.e., a wavelength range of 420 to 700 nm, demonstrating that good antireflection performance was achieved.

Example 6

An optical element 300 according to Example 6 of the present disclosure will now be described. In the present example, a description of a configuration similar to those of the examples described above is omitted.

The material for the substrate 200 is a special PC resin similar to that of Example 5. The materials for the dielectric layer 11 are $SiO_2$ including 0.001% by weight of Al and a mixture of $Ta_2O_5$ and $ZrO_2$. The material for the porous layer 10 is chain-like silica similar to that of Example 1. The dielectric layer 11 according to the present example consists of five layers, unlike that of Example 5. The methods for forming the dielectric layer 11 and the porous layer 10 are similar to those of Example 1.

Table 6 shows details of the configuration of the optical element 300 according to the present example.

TABLE 6

| | | Refractive index (d-line) | Physical thickness (nm) |
|---|---|---|---|
| | Material | | |
| Porous layer 10 | Chain-like silica | 1.25 | 114.5 |
| Dielectric layer 11 Layer 5 | $Ta_2O_5 + ZrO_2$ | 2.00 | 31.1 |
| Layer 4 | $SiO_2$ (Al content: 0.001% by weight) | 1.45 | 28.1 |
| Layer 3 | $Ta_2O_5 + ZrO_2$ | 2.00 | 66.6 |
| Layer 2 | $SiO_2$ (Al content: 0.001% by weight) | 1.45 | 21.2 |
| Layer 1 | $Ta_2O_5 + ZrO_2$ | 2.00 | 27.0 |
| Substrate 200 | Special PC | 1.64 | — |

Figure 7:
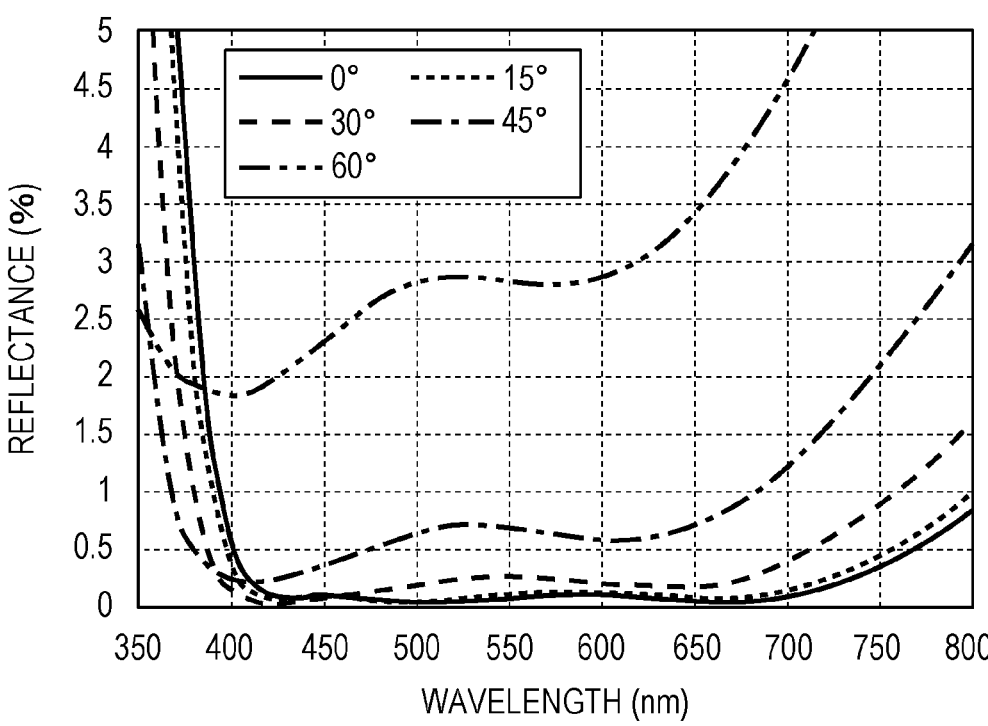
FIG. 7 is a graph showing the reflectance characteristics of an optical element according to Example 6 of the present disclosure.

FIG. 7 shows the reflectance characteristics of the optical element 300 according to the present example as in Example 1. As shown in FIG. 7, the reflectance at an angle of incidence of 0° is 0.15% or less in the visible region, i.e., a wavelength range of 420 to 700 nm, demonstrating that good antireflection performance was achieved.

Example 7

An optical element 300 according to Example 7 of the present disclosure will now be described. In the present example, a description of a configuration similar to those of the examples described above is omitted.

The material for the substrate 200 is a special PC resin similar to that of Example 5. The materials for the dielectric layer 11 are $SiO_2$ including 0.03% by weight of Al and $Ta_2O_5$. The material for the porous layer 10 is hollow particles (hollow silica) consisting of $SiO_2$. The method for forming the dielectric layer 11 is similar to that of Example 1.

Table 7 shows details of the configuration of the optical element 300 according to the present example.

TABLE 7

| | | Refractive index (d-line) | Physical thickness (nm) |
|---|---|---|---|
| | Material | | |
| Porous layer 10 | Hollow silica | 1.25 | 144.3 |
| Dielectric layer 11 Layer 6 | $Ta_2O_5$ | 2.00 | 18.8 |
| Layer 5 | $SiO_2$ (Al content: 0.03% by weight) | 1.46 | 62.6 |
| Layer 4 | $Ta_2O_5$ | 2.00 | 38.9 |
| Layer 3 | $SiO_2$ (Al content: 0.03% by weight) | 1.46 | 39.9 |
| Layer 2 | $Ta_2O_5$ | 2.00 | 27.0 |
| Layer 1 | $SiO_2$ (Al content: 0.03% by weight) | 1.46 | 13.3 |
| Substrate 200 | Special PC | 1.64 | — |

A method for forming the porous layer 10 according to the present example will now be described.

(d) Method for Forming Porous Layer 10

(d-1) Preparation of Hollow Silica Coating Liquid and Binder Solution

First, 6.00 g of a dispersion (hollow silica dispersion) including hollow silica particles and a solvent was diluted with 28.17 g of 1-methoxy-2-propanol to obtain a hollow silica coating liquid (solid content: 3.60% by mass). As the hollow silica dispersion, THRULYA 1110 (average particle size: 55 nm, solid content: 20.50% by mass) available from JGC Catalysts and Chemicals Ltd., which is a dispersion containing IPA as a solvent, was used.

Next, a binder solution for hollow silica was prepared. Specifically, 26.0 g of TEOS available from Tokyo Chemical Industry Co., Ltd. and 22.5 g (10 equivalents based on TEOS) of 0.01 M dilute hydrochloric acid, serving as a catalyst in water, were added to 7.7 g of 1-ethoxy-2-propanol available from Kishida Chemical Co., Ltd. and were mixed and stirred for 60 minutes. The mixture was further stirred in an oil bath at 60° C. for 40 minutes. 1-Ethoxy-2-propanol and 2-ethylbutanol were then added to a silica solid content of 0.8 wt % to obtain a binder solution. Here, the ratio of 1-ethoxy-2-propanol to 2-ethylbutanol was 3:7.

(d-2) Method for Applying Porous Layer 10

After the hollow silica coating liquid was dispensed onto the dielectric layer 11 formed on the substrate 200, spin coating was performed at 3,000 rpm for 20 seconds to form a layer consisting of hollow silica fine particles. Subsequently, after the binder solution was dispensed onto the layer consisting of hollow silica fine particles, spin coating was performed at 4,500 rpm for 20 seconds. The coating was then baked in a hot-air circulating oven at 25° C. for 10 minutes to form a porous layer 10.

Figure 8:
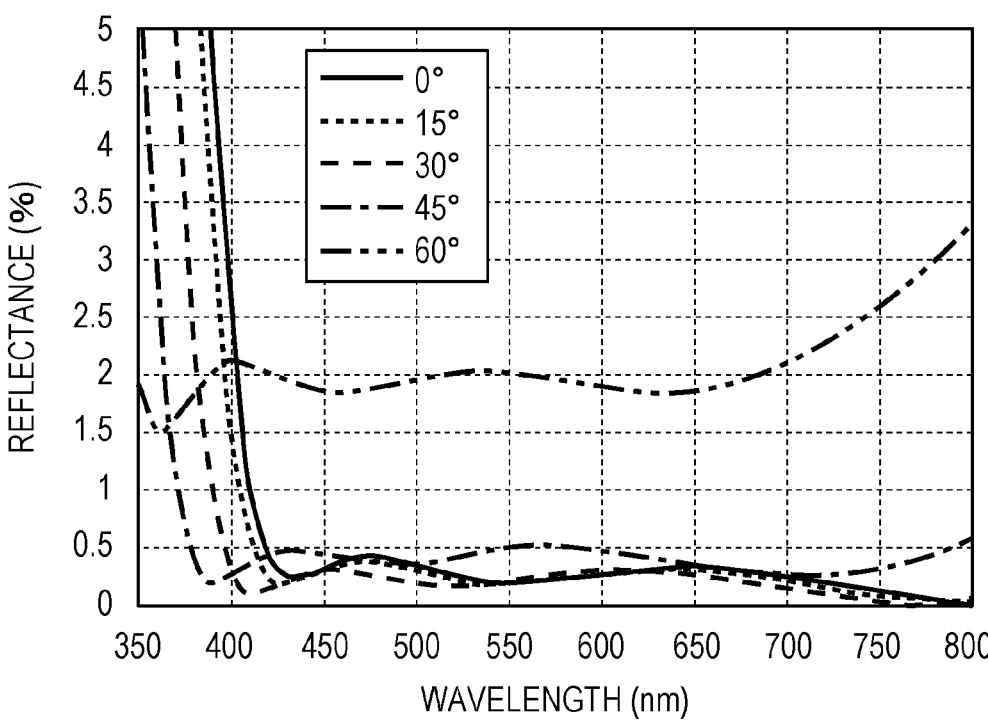
FIG. 8 is a graph showing the reflectance characteristics of an optical element according to Example 7 of the present disclosure.

FIG. 8 shows the reflectance characteristics of the optical element 300 according to the present example as in Example 1. As shown in FIG. 8, the reflectance at an angle of incidence of 60° is 0.21% or less in the visible region, i.e., a wavelength range of 420 to 700 nm, demonstrating that good antireflection performance was also achieved at a large angle of incidence.

Example 8

An optical element 300 according to Example 8 of the present disclosure will now be described. In the present example, a description of a configuration similar to those of the examples described above is omitted.

The material for the substrate 200 is a special PC resin similar to that of Example 5. The materials for the dielectric layer 11 are $SiO_2$ including 10.0% by weight of Al and $Ta_2O_5$. The material for the porous layer 10 is hollow silica similar to that of Example 7. The dielectric layer 11 according to the present example consists of five layers, unlike that of Example 7. The methods for forming the dielectric layer 11 and the porous layer 10 are similar to those of Example 7.

Table 8 shows details of the configuration of the optical element 300 according to the present example.

TABLE 8

| | | Material | Refractive index (d-line) | Physical thickness (nm) |
|---|---|---|---|---|
| Porous layer 10 | | Hollow silica | 1.25 | 144.4 |
| Dielectric layer 11 | Layer 5 | $Ta_2O_5$ | 2.00 | 18.0 |
| | Layer 4 | $SiO_2$ (Al content: 10.0% by weight) | 1.47 | 62.7 |
| | Layer 3 | $Ta_2O_5$ | 2.00 | 37.6 |
| | Layer 2 | $SiO_2$ (Al content: 10.0% by weight) | 1.47 | 37.4 |
| | Layer 1 | $Ta_2O_5$ | 2.00 | 21.4 |
| Substrate 200 | | Special PC | 1.64 | — |

Figure 9:
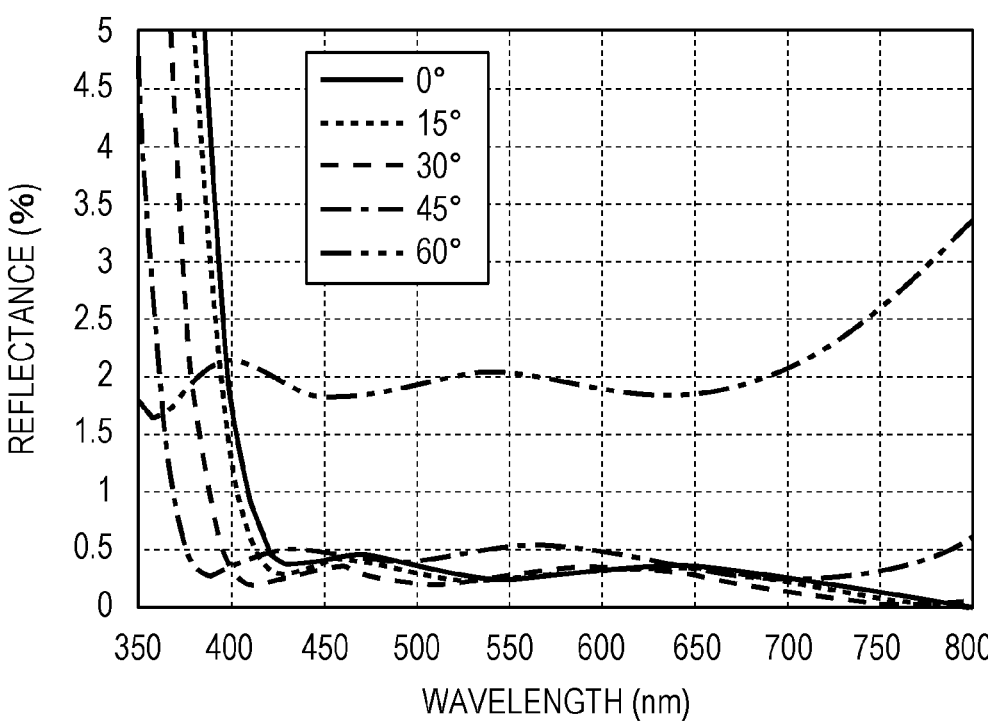
FIG. 9 is a graph showing the reflectance characteristics of an optical element according to Example 8 of the present disclosure.

FIG. 9 shows the reflectance characteristics of the optical element 300 according to the present example as in Example 1. As shown in FIG. 9, the reflectance at an angle of incidence of 60° is 0.21% or less in the visible region, i.e., a wavelength range of 420 to 700 nm, demonstrating that good antireflection performance was also achieved at a large angle of incidence.

Example 9

An optical element 300 according to Example 9 of the present disclosure will now be described. In the present example, a description of a configuration similar to those of the examples described above is omitted.

The material for the substrate 200 according to the present example is EP-9000 available from Mitsubishi Gas Chemical Company, Inc., which is a special polycarbonate (PC) resin having a refractive index of 1.67 for the d-line. The materials for the dielectric layer 11 are $SiO_2$ and $Ta_2O_5$. The material for the porous layer 10 is hollow silica similar to that of Example 7. A protective layer 20 containing TEOS as a principal component is disposed on the porous layer 10. The method for forming the dielectric layer 11 is similar to that of Example 1.

Table 9 shows details of the configuration of the optical element 300 according to the present example.

TABLE 9

| | | Material | Refractive index (d-line) | Physical thickness (nm) |
|---|---|---|---|---|
| Protective layer 20 | | TEOS | 1.42 | 20.0 |
| Porous layer 10 | | Hollow silica | 1.25 | 91.2 |
| Dielectric layer 11 | Layer 6 | $Ta_2O_5$ | 2.00 | 27.6 |
| | Layer 5 | $SiO_2$ | 1.46 | 46.2 |
| | Layer 4 | $Ta_2O_5$ | 2.00 | 45.7 |
| | Layer 3 | $SiO_2$ | 1.46 | 37.5 |
| | Layer 2 | $Ta_2O_5$ | 2.00 | 28.7 |
| | Layer 1 | $SiO_2$ | 1.46 | 18.1 |
| Substrate 200 | | Special PC | 1.67 | — |

A method for forming the porous layer 10 and the protective layer 20 according to the present example will now be described.

(e) Method for Forming Porous Layer 10 and Protective Layer 20

(e-1) Preparation of Hollow Silica Coating Liquid and Binder Solution

A hollow silica coating liquid and a binder solution according to the present example were prepared in the same manner as in (d-1) of Example 7.

(e-2) Preparation of Protective Layer Coating Liquid

A protective layer coating liquid according to the present example was prepared in the same manner as in (c-2) of Example 3. The protective layer coating liquid in Example 3 is identical to the binder solution in Example 7.

(e-3) Method for Applying Porous Layer 10 and Protective Layer 20

After 0.2 mL of the hollow silica coating liquid was dispensed onto the dielectric layer 11 formed on the substrate 200, spin coating was performed at 3,000 rpm for 20 seconds. Subsequently, after 0.2 mL of the binder solution was dispensed onto the hollow silica coating liquid applied to the dielectric layer 11, spin coating was performed at 4,000 rpm for 20 seconds. The coating was then baked in a hot-air circulating oven at 25° C. for 10 minutes to form a porous layer 10. Subsequently, after 0.2 mL of the protective layer coating liquid was dispensed onto the porous layer 10, spin coating was performed at 4,000 rpm for 20 seconds. The coating was then baked in a hot-air circulating oven at 25° C. for 10 minutes to form a protective layer 20.

Figure 10:
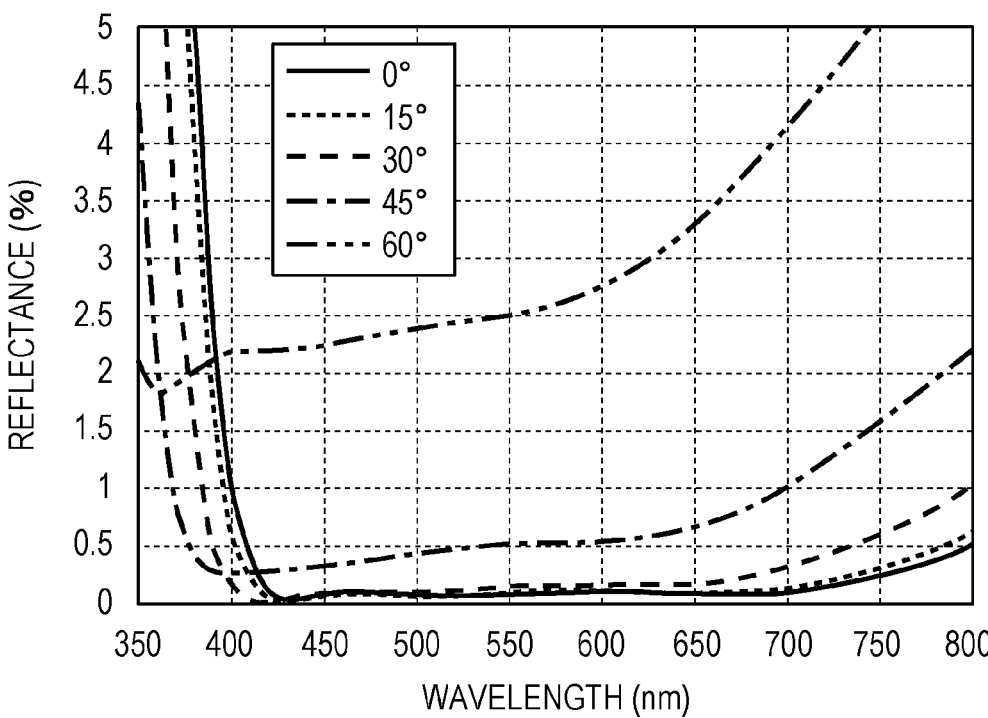
FIG. 10 is a graph showing the reflectance characteristics of an optical element according to Example 9 of the present disclosure.

FIG. 10 shows the reflectance characteristics of the optical element 300 according to the present example as in Example 1. As shown in FIG. 10, the reflectance at an angle of incidence of 0° is 0.15% or less in the visible region, i.e., a wavelength range of 420 to 700 nm, demonstrating that good antireflection performance was achieved.

Example 10

An optical element 300 according to Example 10 of the present disclosure will now be described. In the present example, a description of a configuration similar to those of the examples described above is omitted.

The material for the substrate 200 is a special PC resin similar to that of Example 9. The materials for the dielectric layer 11 are $SiO_2$ including 0.001% by weight of Al and a mixture of $Ta_2O_5$ and $TiO_2$. The material for the porous layer 10 is hollow silica similar to that of Example 7. The material for the protective layer 20 is a material, containing TEOS as a principal component, similar to that of Example 9. The dielectric layer 11 according to the present example consists of five layers, unlike that of Example 9. The methods for forming the dielectric layer 11 and the porous layer 10 are similar to those of Example 7.

Table 10 shows details of the configuration of the optical element 300 according to the present example.

TABLE 10

|  |  | Material | Refractive index (d-line) | Physical thickness (nm) |
|---|---|---|---|---|
| Protective layer 20 |  | TEOS | 1.42 | 20.0 |
| Porous layer 10 |  | Hollow silica | 1.25 | 87.3 |
| Dielectric layer 11 | Layer 5 | $Ta_2O_5 + TiO_2$ | 2.00 | 30.0 |
|  | Layer 4 | $SiO_2$ (Al content: 0.001% by weight) | 1.45 | 38.1 |
|  | Layer 3 | $Ta_2O_5 + TiO_2$ | 2.00 | 55.8 |
|  | Layer 2 | $SiO_2$ (Al content: 0.001% by weight) | 1.45 | 28.0 |
|  | Layer 1 | $Ta_2O_5 + TiO_2$ | 2.00 | 24.4 |
| Substrate 200 |  | Special PC | 1.67 | — |

Figure 11:
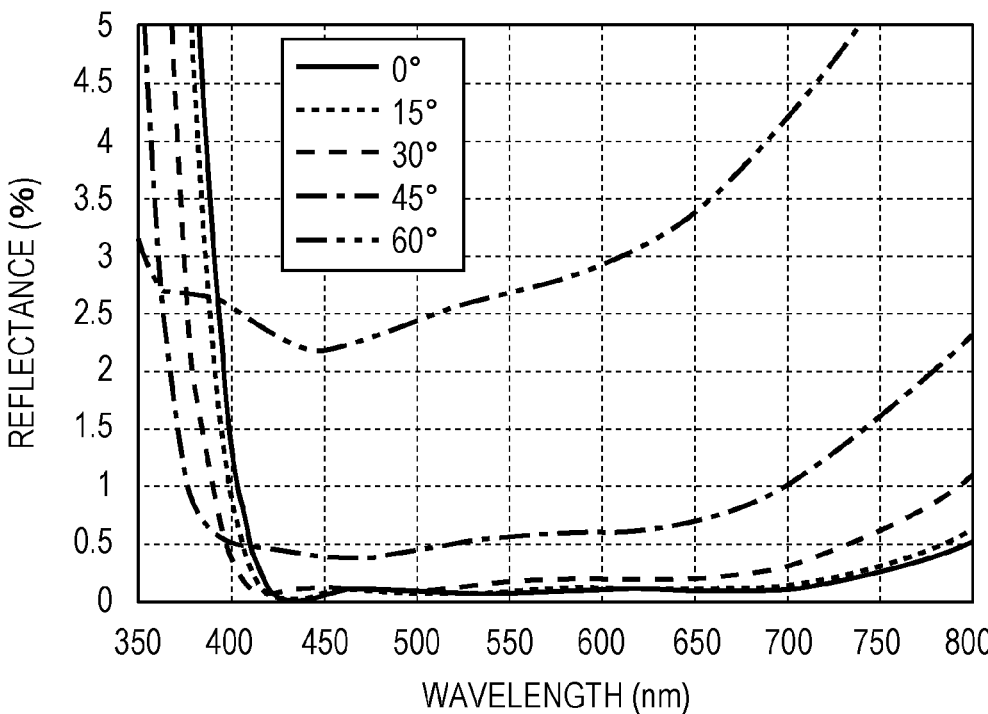
FIG. 11 is a graph showing the reflectance characteristics of an optical element according to Example 10 of the present disclosure.

FIG. 11 shows the reflectance characteristics of the optical element 300 according to the present example as in Example 1. As shown in FIG. 11, the reflectance at an angle of incidence of 0° is 0.15% or less in the visible region, i.e., a wavelength range of 420 to 700 nm, demonstrating that good antireflection performance was achieved.

Example 11

An optical element 300 according to Example 11 of the present disclosure will now be described. In the present example, a description of a configuration similar to those of the examples described above is omitted.

The material for the substrate 200 is a special PC resin similar to that of Example 9. The materials for the dielectric layer 11 are $SiO_2$ including 3.0% by weight of Al and a mixture of $Ta_2O_5$ and $ZrO_2$. The material for the porous layer 10 is hollow silica similar to that of Example 7. The material for the protective layer 20 is a material, containing TEOS as a principal component, similar to that of Example 9. The methods for forming the dielectric layer 11, the porous layer 10, and the protective layer 20 are similar to those of Example 9.

Table 11 shows details of the configuration of the optical element 300 according to the present example.

TABLE 11

|  |  | Material | Refractive index (d-line) | Physical thickness (nm) |
|---|---|---|---|---|
| Protective layer 20 |  | TEOS | 1.42 | 20.0 |
| Porous layer 10 |  | Hollow silica | 1.25 | 104.4 |
| Dielectric layer 11 | Layer 6 | $Ta_2O_5$ and $ZrO_2$ | 2.00 | 26.0 |
|  | Layer 5 | $SiO_2$ (Al content: 3.0% by weight) | 1.46 | 43.1 |
|  | Layer 4 | $Ta_2O_5$ and $ZrO_2$ | 2.00 | 59.8 |
|  | Layer 3 | $SiO_2$ (Al content: 3.0% by weight) | 1.46 | 26.8 |
|  | Layer 2 | $Ta_2O_5$ and $ZrO_2$ | 2.00 | 34.5 |
|  | Layer 1 | $SiO_2$ (Al content: 3.0% by weight) | 1.46 | 12.2 |
| Substrate 200 |  | Special PC | 1.67 | — |

Figure 12:
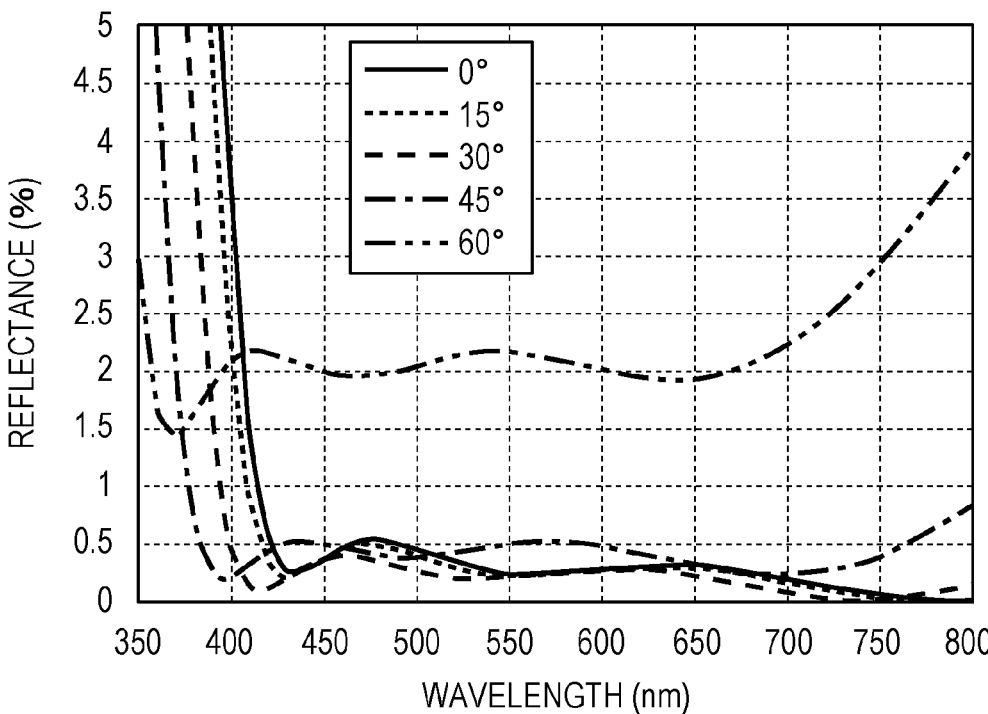
FIG. 12 is a graph showing the reflectance characteristics of an optical element according to Example 11 of the present disclosure.

FIG. 12 shows the reflectance characteristics of the optical element 300 according to the present example as in Example 1. As shown in FIG. 12, the reflectance at an angle of incidence of 60° is 2.5% or less in the visible region, i.e., a wavelength range of 420 to 700 nm, demonstrating that good antireflection performance was also achieved at a large angle of incidence.

Example 12

An optical element 300 according to Example 12 of the present disclosure will now be described. In the present example, a description of a configuration similar to those of the examples described above is omitted.

The material for the substrate 200 is a special PC resin similar to that of Example 9. The materials for the dielectric layer 11 are $SiO_2$ including 10.0% by weight of Al and a mixture of $Ta_2O_5$ and $ZrO_2$. The material for the porous layer 10 is hollow silica similar to that of Example 7. The material for the protective layer 20 is a material, containing TEOS as a principal component, similar to that of Example 9. The methods for forming the dielectric layer 11, the porous layer 10, and the protective layer 20 are similar to those of Example 9.

Table 12 shows details of the configuration of the optical element 300 according to the present example.

TABLE 12

|  |  | Material | Refractive index (d-line) | Physical thickness (nm) |
|---|---|---|---|---|
| Protective layer 20 |  | TEOS | 1.42 | 20.0 |
| Porous layer 10 |  | Hollow silica | 1.25 | 104.7 |
| Dielectric layer 11 | Layer 5 | $Ta_2O_5 + ZrO_2$ | 2.00 | 24.8 |

TABLE 12-continued

|  | | Material | Refractive index (d-line) | Physical thickness (nm) |
|---|---|---|---|---|
|  | Layer 4 | $SiO_2$ (Al content: 10% by weight) | 1.47 | 44.8 |
|  | Layer 3 | $Ta_2O_5$ + $ZrO_2$ | 2.00 | 56.6 |
|  | Layer 2 | $SiO_2$ (Al content: 10% by weight) | 1.47 | 25.2 |
|  | Layer 1 | $Ta_2O_5$ + $ZrO_2$ | 2.00 | 27.8 |
| Substrate 200 | | Special PC | 1.67 | — |

Figure 13:
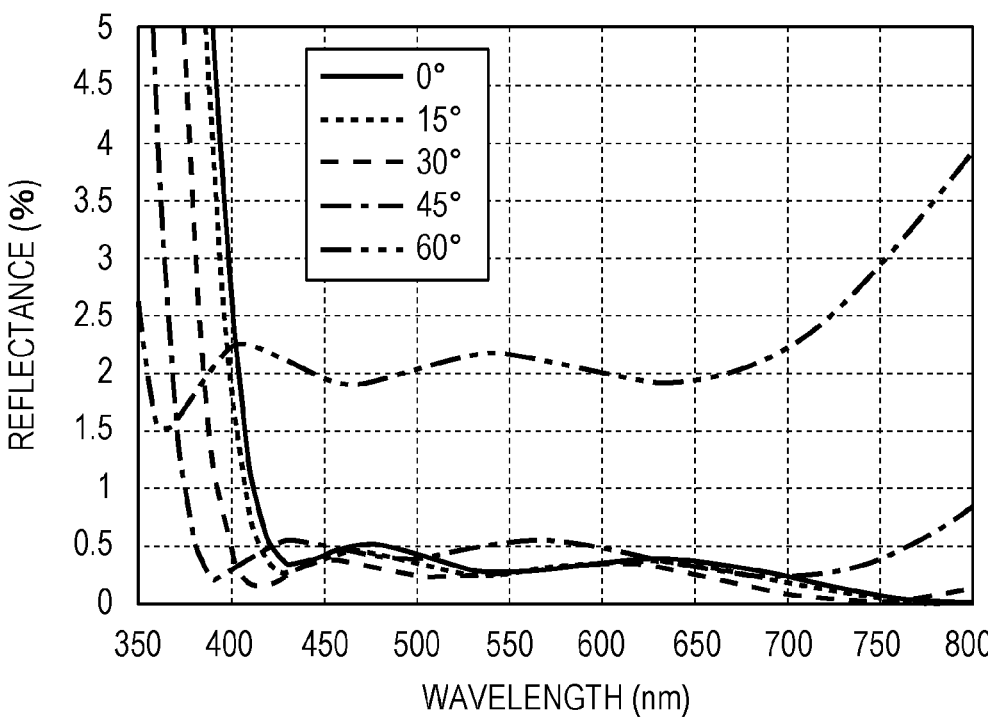
FIG. 13 is a graph showing the reflectance characteristics of an optical element according to Example 12 of the present disclosure.

FIG. 13 shows the reflectance characteristics of the optical element 300 according to the present example as in Example 1. As shown in FIG. 13, the reflectance at an angle of incidence of 60° is 2.5% or less in the visible region, i.e., a wavelength range of 420 to 700 nm, demonstrating that good antireflection performance was also achieved at a large angle of incidence.

Comparative Example 1

An optical element 300 according to Comparative Example 1 for illustrating the advantages of the present disclosure will now be described. The optical element 300 according to the present comparative example differs from that of Example 1 in that the uppermost layer is a magnesium fluoride ($MgF_2$) layer serving as the dielectric layer 11, rather than a porous layer.

The material for the substrate 200 is a COP resin similar to that of Example 1. As the materials for the dielectric layer 11, $MgF_2$ is used for the uppermost layer in addition to $SiO_2$ and $Ta_2O_5$, as in Example 1.

The method for forming the dielectric layer 11 is similar to that of Example 1.

Table 13 shows details of the configuration of the optical element 300 according to the present comparative example.

TABLE 13

|  | | Material | Refractive index (d-line) | Physical thickness (nm) |
|---|---|---|---|---|
| Dielectric layer 11 | Layer 7 | $MgF_2$ | 1.38 | 96.5 |
| | Layer 6 | $Ta_2O_5$ | 2.00 | 63.7 |
| | Layer 5 | $SiO_2$ | 1.47 | 12.0 |
| | Layer 4 | $Ta_2O_5$ | 2.00 | 51.2 |
| | Layer 3 | $SiO_2$ | 1.47 | 56.0 |
| | Layer 2 | $Ta_2O_5$ | 2.00 | 12.7 |
| | Layer 1 | $SiO_2$ | 1.47 | 65.5 |
| Substrate 200 | | COP resin | 1.53 | — |

Figure 14:
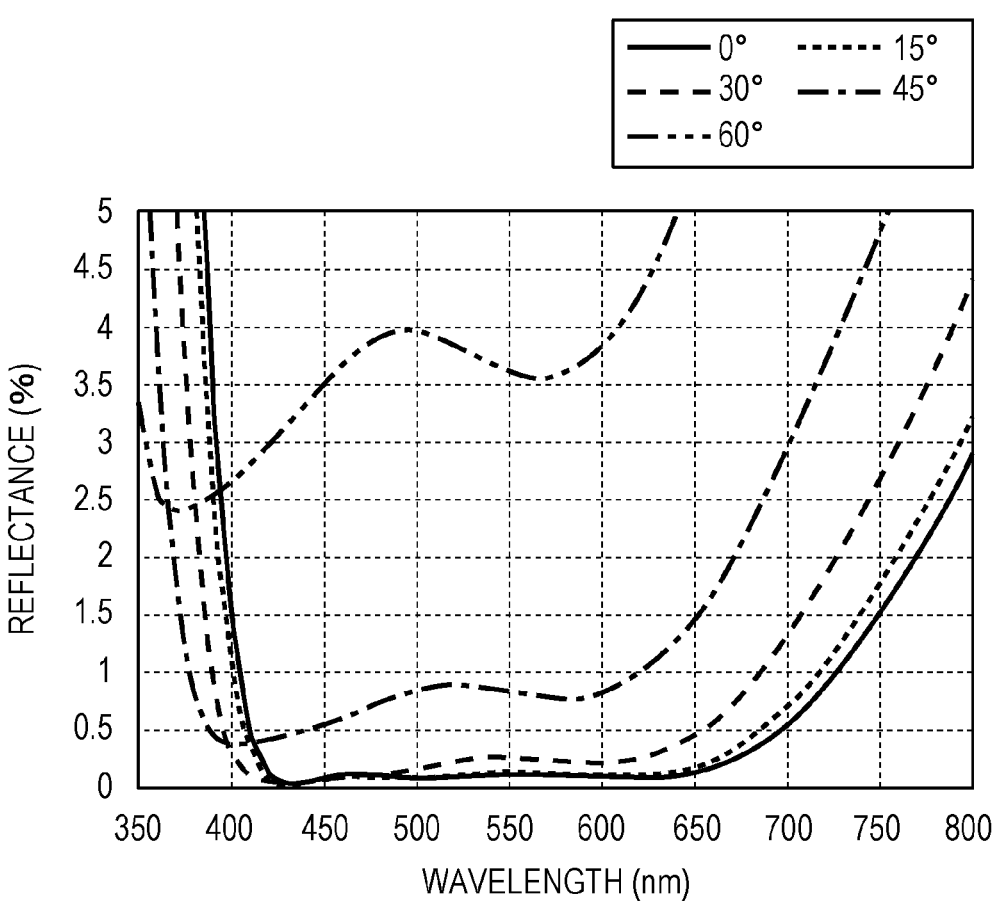
FIG. 14 is a graph showing the reflectance characteristics of an optical element according to Comparative Example 1.

FIG. 14 shows the reflectance characteristics of the optical element 300 according to the present comparative example as in Example 1. As shown in FIG. 14, the reflectance at an angle of incidence of 0° is 0.15% or less in the visible region, i.e., a wavelength range of 420 to 700 nm. However, a comparison with the reflectance characteristics (FIG. 2) of the optical element 300 according to Example 1 shows that the wavelength band in which the reflectance is sufficiently low is narrower and the reflectance at a large angle of incidence is increased.

Comparative Example 2

An optical element 300 according to Comparative Example 2 for illustrating the advantages of the present disclosure will now be described. The optical element 300 according to the present comparative example differs from that of Comparative Example 1 in that the uppermost layer of the dielectric layer 11 is a $SiO_2$ layer, rather than a magnesium fluoride layer.

The material for the substrate 200 is a COP resin similar to that of Example 1. The materials for the dielectric layer 11 are $SiO_2$ and $Ta_2O_5$, as in Example 1. The method for forming the dielectric layer 11 is similar to that of Example 1.

Table 14 shows details of the configuration of the optical element 300 according to the present comparative example.

TABLE 14

|  | | Material | Refractive index (d-line) | Physical thickness (nm) |
|---|---|---|---|---|
| Dielectric layer 11 | Layer 7 | $SiO_2$ | 1.47 | 95.6 |
| | Layer 6 | $Ta_2O_5$ | 2.00 | 69.6 |
| | Layer 5 | $SiO_2$ | 1.47 | 17.2 |
| | Layer 4 | $Ta_2O_5$ | 2.00 | 42.6 |
| | Layer 3 | $SiO_2$ | 1.47 | 62.9 |
| | Layer 2 | $Ta_2O_5$ | 2.00 | 12.0 |
| | Layer 1 | $SiO_2$ | 1.47 | 66.4 |
| Substrate 200 | | COP resin | 1.53 | — |

Figure 15:
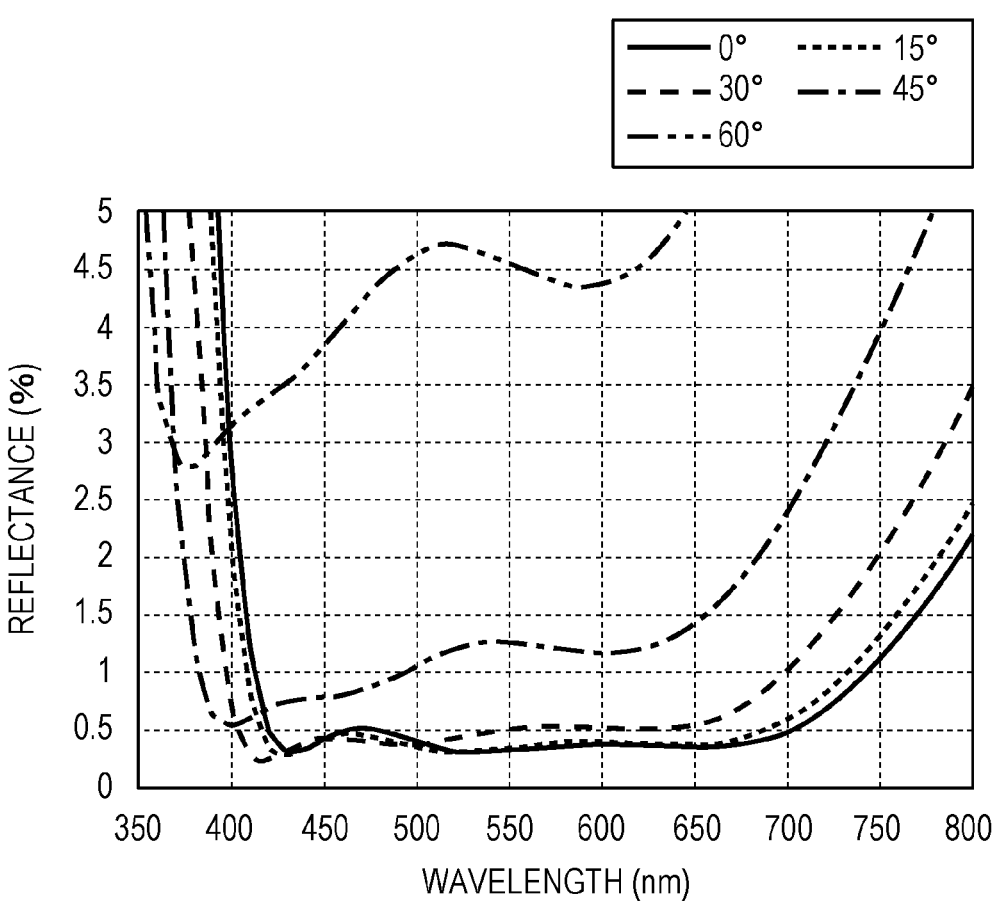
FIG. 15 is a graph showing the reflectance characteristics of an optical element according to Comparative Example 2.

FIG. 15 shows the reflectance characteristics of the optical element 300 according to the present comparative example as in Example 1. As shown in FIG. 15, the reflectance at an angle of incidence of 0° is about 0.5% in the visible region, i.e., a wavelength range of 420 to 700 nm. A comparison with the reflectance characteristics (FIG. 2) of the optical element 300 according to Example 1 shows that the reflectance is increased.

Next, the methods of durability tests performed to examine the durability of the antireflection films 100 according to the Examples and Comparative Examples under various conditions will now be described.

High-Temperature, High-Humidity Storage Test

A sample of each fabricated optical element 300 was stored in a constant-temperature chamber set to a temperature of 60° C. and a humidity of 90% for 1,000 hours and was then visually inspected for the external appearance of the antireflection film 100.

Low-Temperature Storage Test

A sample of each fabricated optical element 300 was stored in a constant-temperature chamber set to a temperature of –30° C. for 1,000 hours and was then visually inspected for the external appearance of the antireflection film 100.

High-Temperature Storage Test

A sample of each fabricated optical element 300 was stored in a constant-temperature chamber set to a temperature of 70° C. for 12 hours and was then visually inspected for the external appearance of the antireflection film 100.

Table 15 summarizes the antireflection performance of the antireflection films 100 according to the Examples and Comparative Examples and the results of the above durability tests.

TABLE 15

|  | Anti-reflection performance | High-temperature, high-humidity Storage | Low-temperature storage | High-temperature storage |
|---|---|---|---|---|
| Example 1 | Good | Good | Good | Good |
| Example 2 | Good | Good | Good | Good |
| Example 3 | Good | Good | Good | Good |
| Example 4 | Good | Good | Good | Good |

TABLE 15-continued

| | Anti-reflection performance | High-temperature, high-humidity Storage | Low-temperature storage | High-temperature storage |
|---|---|---|---|---|
| Example 5 | Good | Good | Good | Good |
| Example 6 | Good | Good | Good | Good |
| Example 7 | Good | Good | Good | Good |
| Example 8 | Good | Good | Good | Good |
| Example 9 | Good | Good | Good | Good |
| Example 10 | Good | Good | Good | Good |
| Example 11 | Good | Good | Good | Good |
| Example 12 | Good | Good | Good | Good |
| Comparative Example 1 | Fair | Film cracking occurred | Film cracking occurred | Film cracking occurred |
| Comparative Example 2 | Poor | Good | Good | Good |

As shown in Table 15, the results for the Examples showed that no film cracking or peeling occurred in any of the durability tests, and both good antireflection performance and high environmental durability were achieved. In contrast, the results for Comparative Example 1 showed that film cracking or peeling occurred in the durability tests because $MgF_2$, in which a large tensile stress occurs, was used for the uppermost layer. In addition, the results for Comparative Example 2 showed that, although no film cracking or peeling occurred, good antireflection performance was not achieved, as described above.

Optical System and Optical Device

Next, an optical system 400 and an optical device 500 according to an embodiment of the present disclosure will now be described.

Figure 16:
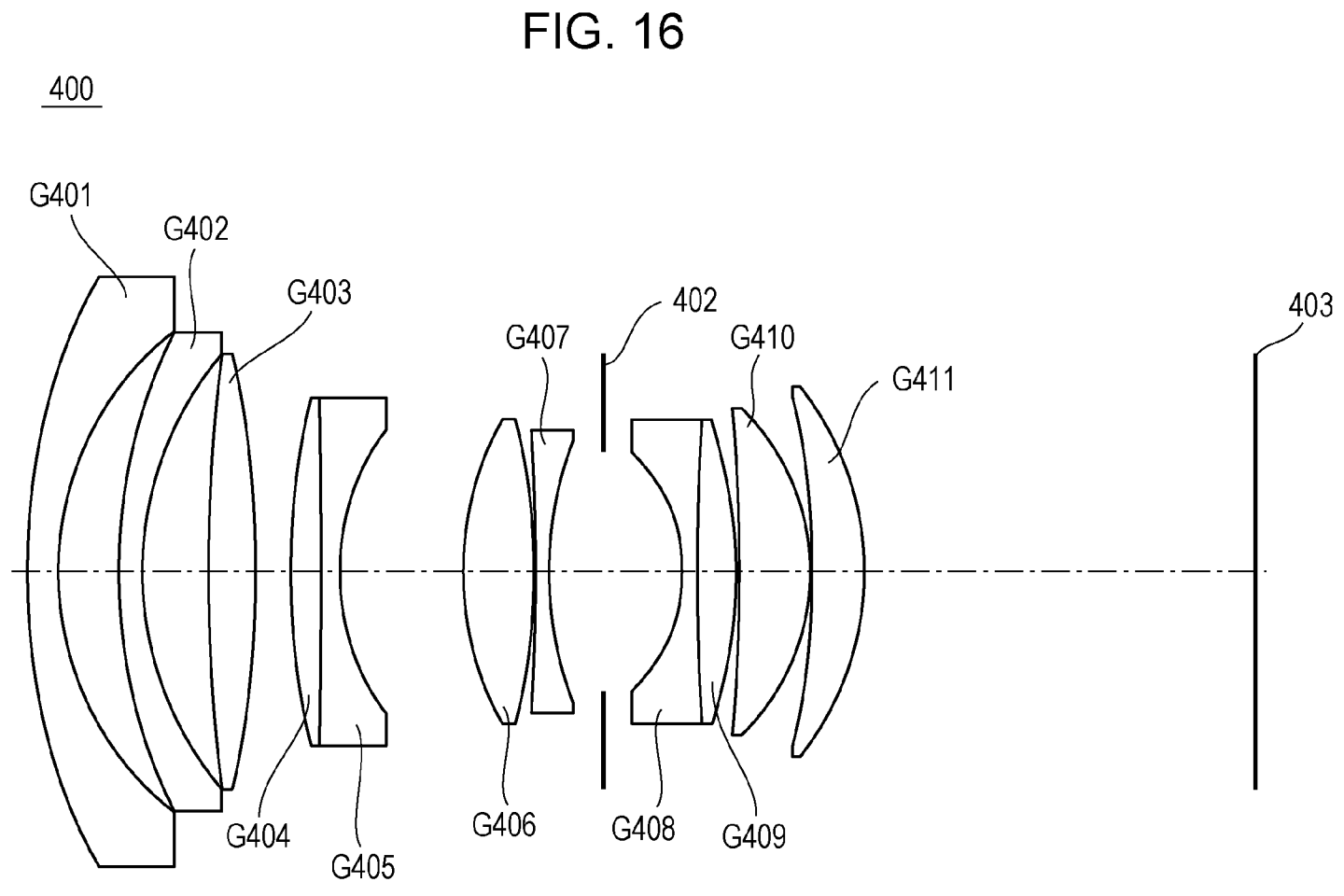

FIG. 16 shows a schematic view of a cross-section including the optical axis (one-dot chain line) of the optical system 400 according to the present embodiment. The optical system 400 is an image-forming optical system including a plurality of optical elements (lenses) G401 to G411 and a diaphragm 402 and configured to form an image of an object on an image plane 403. The antireflection film 100 according to the embodiment described above is disposed on at least one of the entrance and exit surfaces of at least one of the optical elements G401 to G411. To achieve good antireflection performance over the entire optical system 400, the antireflection film 100 may be disposed on all optical elements, and the antireflection film 100 may be disposed on both the entrance and exit surfaces of each optical element. When optical elements such as prisms and filters are used, the antireflection film 100 may also be disposed on such optical elements.

Figure 17:
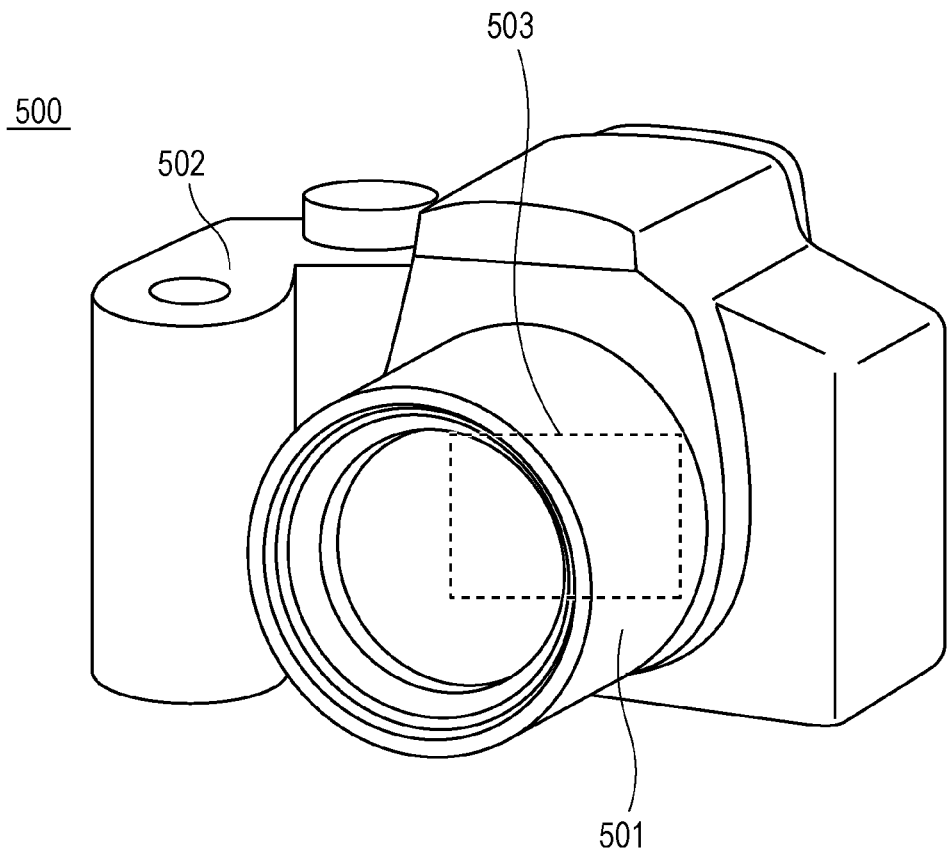
FIG. 17 is a schematic view of an optical device according to an embodiment of the present disclosure.

FIG. 17 shows a schematic view of an image-capturing device (digital camera) 500 serving as the optical device according to the present embodiment. The image-capturing device 500 includes a lens unit 501 including the optical system 400 and a main body 502 including an image-capturing element 503. The optical elements forming the optical system 400 are held by a holder (barrel) in the lens unit 501. The image-capturing element 503 is an element configured to capture an image of an object by receiving light coming from the optical system 400. For example, photoelectric transducers such as CCD sensors and CMOS sensors can be used. The image-capturing element 503 is disposed such that its image-capturing surface (light-receiving surface) coincides with the image plane 403 of the optical system 400.

The lens unit 501 may be integrated with the main body 502 or may be configured to be attachable to and detachable from the main body 502. If the lens unit 501 is attachable to and detachable from the main body 502, the lens unit 501 can be regarded as one optical device (lens device), and the main body 502 can be regarded as one optical device (image-capturing device). The optical elements according to the Examples are not limited to use in image-capturing devices as described above, but can be used in various optical devices such as binoculars, projectors, and telescopes.

Although embodiments and examples of the present disclosure have been described above, the present disclosure is not limited to these embodiments and examples; rather, various combinations, changes, and modifications can be made within the spirit thereof.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-205576, filed Dec. 11, 2020, which is hereby incorporated by reference herein in its entirety.

What is claimed is:

1. An optical element comprising:
a substrate made of a resin material; and
an antireflection film,
wherein the antireflection film consists of a dielectric layer formed on the substrate and a porous layer formed on the dielectric layer,
the dielectric layer includes a first layer, and a second layer adjacent to the first layer and the porous layer,
the porous layer comprises silicon oxide or magnesium fluoride,
the first layer comprises silicon oxide at a weight ratio of 90% or more and aluminum oxide at a weight ratio of 10% or less,
the second layer comprises tantalum oxide, and
wherein the following inequality is satisfied:

$$1.15 \leq n \leq 1.35$$

where n is a refractive index of the porous layer for the d-line.

2. The optical element according to claim 1, wherein the second layer further comprises at least one of titanium oxide, lanthanum oxide, and zirconium oxide.

3. The optical element according to claim 1, wherein the porous layer comprises a plurality of particles consisting of silicon oxide and a binder that binds the plurality of particles to each other.

4. The optical element according to claim 3, wherein the plurality of particles are spherical hollow particles.

5. The optical element according to claim 3, wherein the plurality of particles are solid particles and are bound to each other in a chain-like manner.

6. The optical element according to claim 1, wherein the porous layer further comprises an alcohol with a density of $1.0 \, mg/cm^3$ to $2.8 \, mg/cm^3$, the alcohol including at least one of an ether bond and an ester bond, including 4 to 7 carbon atoms, and having a branched structure.

7. The optical element according to claim 1, wherein the dielectric layer consists of alternately stacked first and second layers.

8. The optical element according to claim 1, wherein, among the layers forming the dielectric layer, the first layer is located at a position closest to the substrate.

9. The optical element according to claim 1, wherein the following inequality is satisfied:

$$1.48 \leq nd \leq 1.80$$

where nd is an average refractive index of the resin material for the d-line.

10. The optical element according to claim 1, wherein the following inequality is satisfied:

$$1.5 \leq \alpha \leq 30.0$$

where $\alpha$ is a coefficient of linear expansion ($10^{-5}/^\circ$ C.) of the resin material.

11. The optical element according to claim 1, wherein the optical element consists of the substrate and the antireflection film.

12. The optical element according to claim 1, wherein the optical element consists of the substrate, the antireflection film, and a protective layer disposed on the antireflection film.

13. An optical device comprising:
the optical element according to claim 1; and
a holder holding the optical element.

14. An optical device comprising:
the optical element according to claim 1; and
an image-capturing element configured to receive light coming from the optical element.

* * * * *